May 19, 1970                S. L. WEINER                3,513,312
PYROELECTRIC INFRARED RADIATION DETECTION SYSTEM FOR THE
ELIMINATION OF STRAY RADIATION ABSORPTION
Filed Nov. 27, 1968
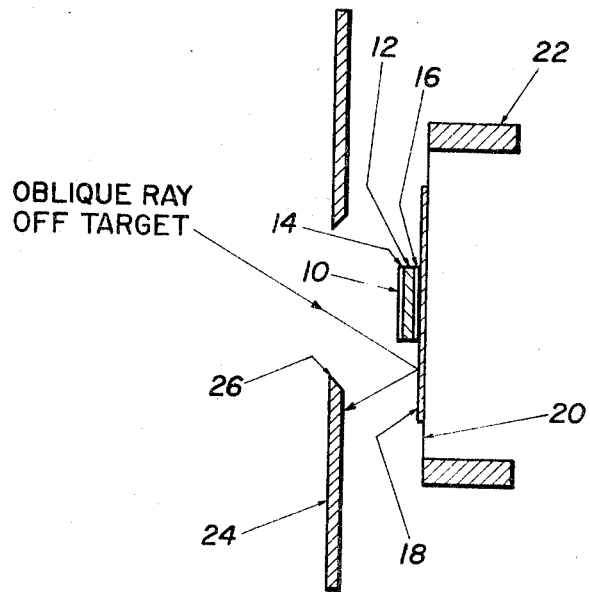
Fig_1
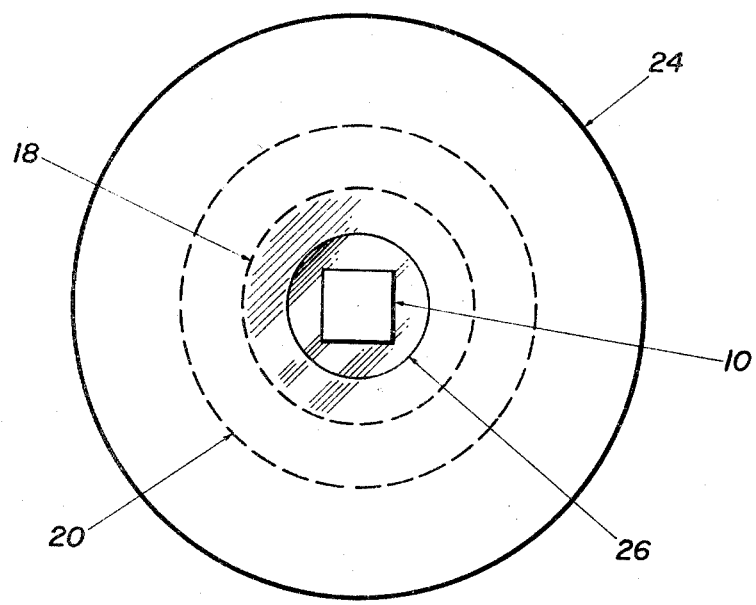
Fig_2
INVENTOR.
SEYMOUR L. WEINER
BY
Joseph Levinson

United States Patent Office

3,513,312
Patented May 19, 1970

3,513,312
PYROELECTRIC INFRARED RADIATION DETECTION SYSTEM FOR THE ELIMINATION OF STRAY RADIATION ABSORPTION
Seymour L. Weiner, Stamford, Conn., assignor to Barnes Engineering Company, Stamford, Conn., a corporation of Delaware
Filed Nov. 27, 1968, Ser. No. 779,331
Int. Cl. G01t 1/16
U.S. Cl. 250—83.3     1 Claim

ABSTRACT OF THE DISCLOSURE

A pyroelectric detector is mounted on a membrane or solid support behind an aperture which is larger than the detector area. The membrane on which the detector is mounted is coated with a thin layer of reflective material in which the area of the reflective material is larger than the aperture that admits radiation to the detector. Oblique rays of energy which pass through the aperture but do not strike the detector area are reflected, and the detector responds only to energy that falls on its area.

BACKGROUND OF THE INVENTION

A pyroelectric detector is a thermal detector based on the pyroelectric effect. The pyroelectric detector is comprised of a body of pyroelectric crystalline material having a pair of conductive electrodes mounted thereon. The pyroelectric crystalline material is electrically polarized, and as such exhibits temperature-dependent charge effects which build up on the electrodes and can be measured. A number of materials such as triglycene sulphate exhibit these effects. The pyroelectric detector then is essentially a capacitor on which a charge, and consequently a voltage, appear when the temperature is changed. At least one electrode on the pyroelectric crystalline material is transparent to the radiation to be measured, and a change in charge will appear on the detector whenever the temperature is changed. Since the detector must be supported on some type of substrate or membrane, the supporting structure also absorbs energy, and transfers this energy to the pyroelectric detector by thermal conduction. This energy, which is absorbed by the supporting structure, distorts the true target area of the detector by making the target appear to be larger than it really is. Accordingly, it is an object of the present invention that the pyroelectric detector respond only to energy which falls directly on its surface area.

SUMMARY OF THE INVENTION

In carrying out this invention in one illustrative embodiment thereof, a pyroelectric detector is mounted on a thin membrane of electrical insulation material, which membrane is coated with a very thin layer of reflective material. An aperture is provided which is larger than the detector, and the reflective coating on which the detector is mounted is larger than the aperture, such that the reflective coating reflects oblique rays of energy that do not strike the detector area.

BRIEF DESCRIPTION OF THE DRAWINGS

FIG. 1 is a side elevational view of the pyroelectric detection system embodied in this invention.

FIG. 2 is a top view of the pyroelectric detection system shown in FIG. 1.

DESCRIPTION OF THE PREFERRED EMBODIMENT

Referring now to FIG. 1, a pyroelectric detector, referred to generally with the reference character 10, has a crystalline body portion 12 which is comprised of a suitable pyroelectric material such as triglycene sulphate. The active body portion of crystalline material 12 has a pair of conductive electrodes 14 and 16 mounted thereon. Incoming radiation is absorbed in the crystalline body 12 which changes the temperature of the pyroelectric detector 10 and builds up a charge and consequently a voltage on the electrodes 14 and 16. The pyroelectric detector is very sensitive to small changes in temperature. The pyroelectric detector 10 is mounted on a thin membrane 20 having a reflective coating 18 thereon. The membrane 20 is an electrical insulator of any suitable material, such as polyglycol terephthalate, which is sold under the trade name of Mylar. The reflective coating 18 is extremely thin, and may be any metallic surface with a high reflectance, such as gold, aluminum, etc. The only requirement on the thickness of the coating is that it be thick enough to be opaque to the energy desired to be reflected, and the thickness may be on the order, for example, of 1000 A. The thickness of the Mylar layer 20 depends on the particular detector application, since the thickness of the membrane affects the detector time constant. However, for most applications it is extremely thin, on the order, for example, of 0.0001″. The membrane 20 is mounted on a support 22 which acts as a heat sink for the detector 10. Positioned in front of the detector 10 is an aperture plate 24 having an aperture 26 therein which limits the amount of radiation applied from the field of view of the detector 10. It should be appreciated that the aperture 26 may be defined by an infrared window which passes the wavelength of radiation desired to be detected.

As will clearly be seen in FIG. 2, the aperture 26 is larger than the detector 10, while the reflective coating 18 is substantially larger than the aperture. The purpose of this structure is to limit the oblique rays entering the aperture to hit only the reflective coating 18 so that they do not strike the detector target area. As has been pointed out, the supporting structure of the pyroelectric detector 10, which includes the membrane 20 and the membrane support 22, absorbs energy and transfers this energy to the detector by thermal conduction. By providing the reflective coating 18, which is considerably larger than the aperture, energy supplied from the field of view and the detector surroundings are reflected. Accordingly, this undesired radiation does not affect the detector response, which responds only to energy which falls directly on it. The reflective coating 18 is so thin that the thermal characteristics of the membrane are essentially unchanged. It should be noted that the aperture does not limit the detector size, and sharpening up the detector field of view to the target of interest does not require stopping down the aperture, which could have the effect of omitting target radiation.

The reflective coating 18 may be mounted on the membrane 20 using conventional evaporative coating techniques. With the coating 18 being considerably larger than the aperture 26, the centering of the detector 10 is not critical. Accordingly, with a relatively simple structure which is easy to fabricate, a technique is provided which limits radiation absorption in a pyroelectric detector to the detector target area only. The detector field of view is sharpened by not limiting target radiation, but by eliminating oblique rays from sources other than the target.

I claim:

1. A pyroelectric infrared detection system for the elimination of stray radiation absorption in a pyroelectric infrared detector comprising:
   (a) an aperture for admitting radiation from a target,
   (b) a pyroelectric infrared detector smaller than said aperture having a pair of electrically conductive electrodes separated by a body of pyroelectric material,
(c) a membrane support having a membrane mounted thereon,
(d) said membrane having a very thin coating of reflective material which does not substantially alter the thermal characteristics of said membrane and is larger than said aperture,
(e) said pyroelectric detector being mounted on said reflective coating behind said aperture whereby said reflective coating reflects oblique rays of energy that do not strike the detector area.

References Cited

UNITED STATES PATENTS

| | | | |
|---|---|---|---|
| 3,202,820 | 8/1965 | Norton et al. | 250—83 |
| 3,398,281 | 8/1968 | Treharne et al. | 250—83.3 |
| 3,444,500 | 5/1969 | Joseph | 338—18 |

RALPH G. NILSON, Primary Examiner

D. L. WILLIS, Assistant Examiner

U.S. Cl. X.R.

250—83